May 7, 1957
F. J. SCHENKELBERGER
2,791,293
INDUSTRIAL TRUCK
Filed Nov. 2, 1953
6 Sheets-Sheet 1
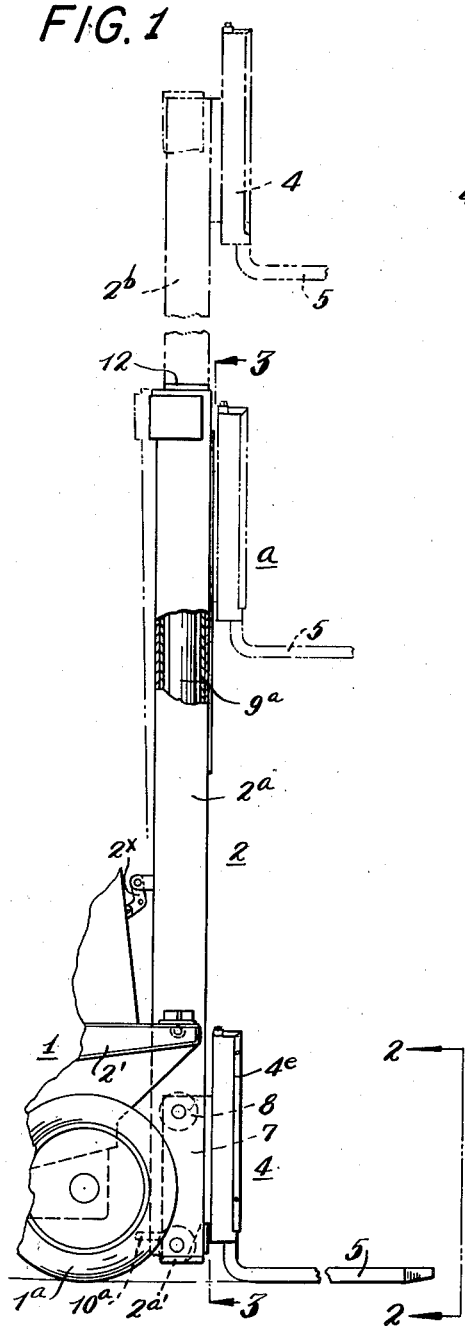
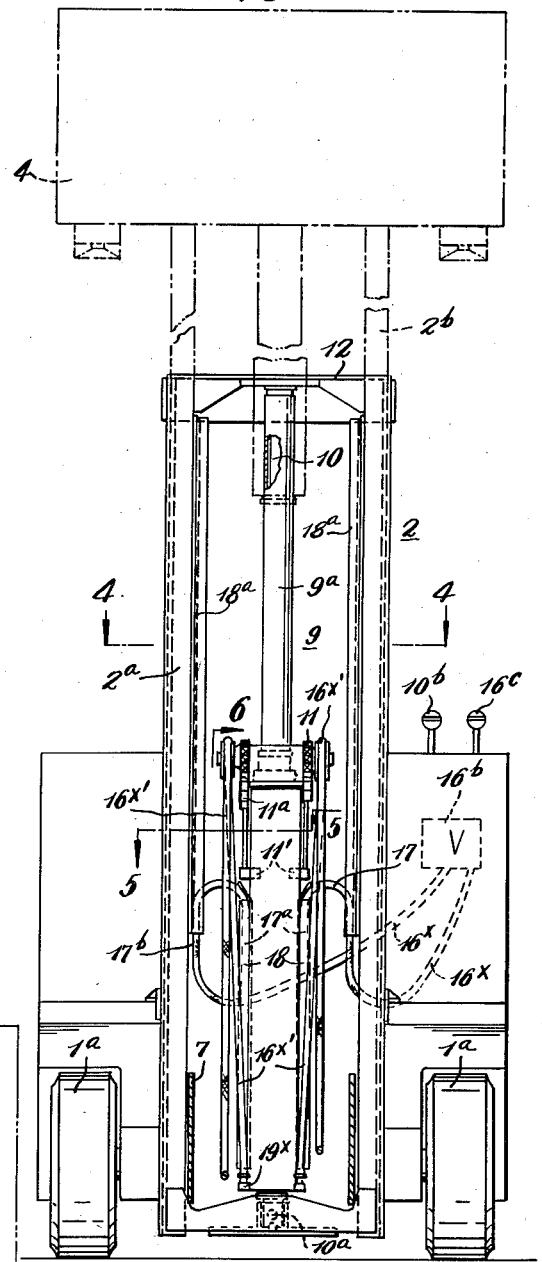
INVENTOR.
FRANK J. SCHENKELBERGER
BY
Geo. B. Pitts
ATTORNEY

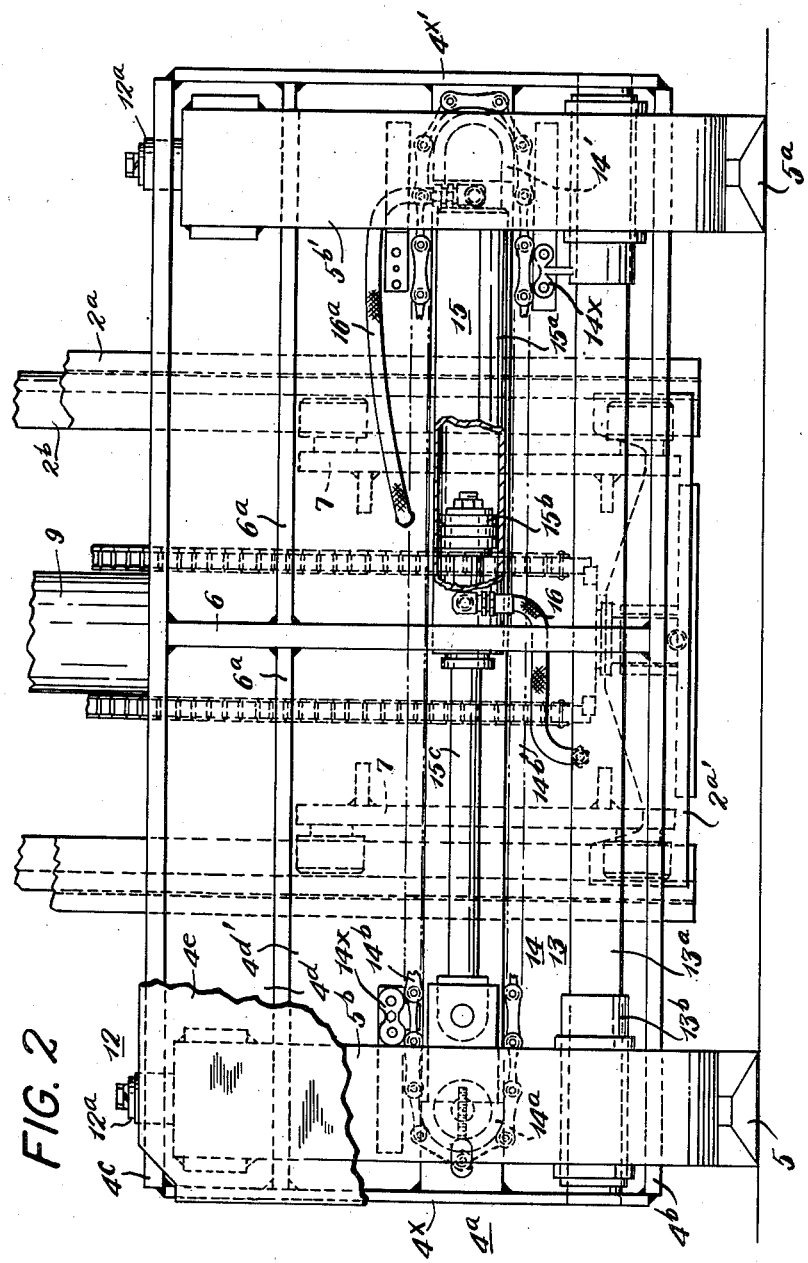

May 7, 1957 F. J. SCHENKELBERGER 2,791,293
INDUSTRIAL TRUCK
Filed Nov. 2, 1953 6 Sheets-Sheet 3
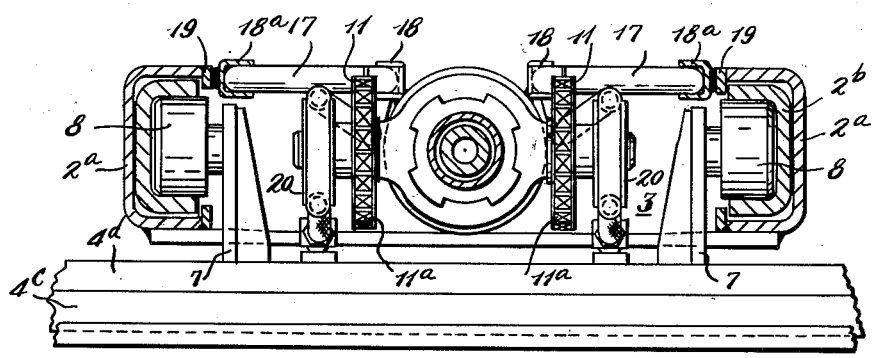
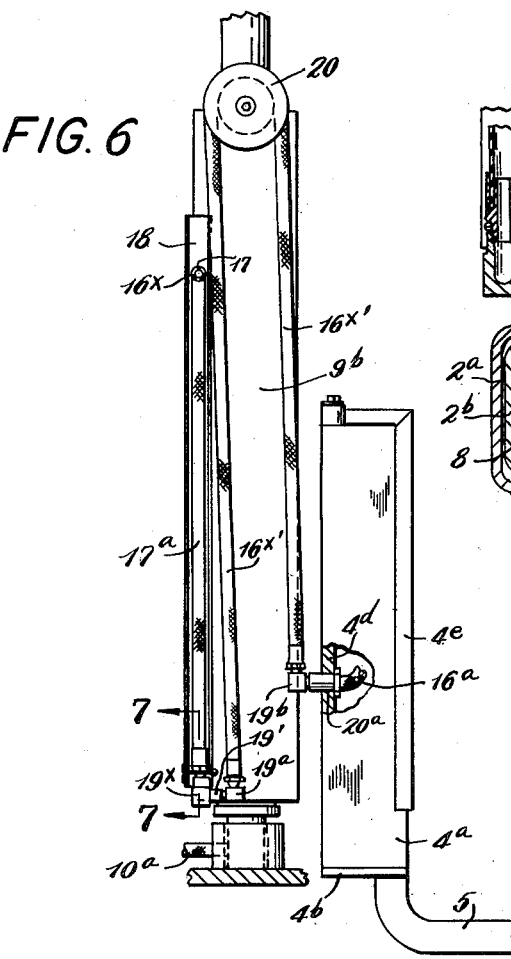
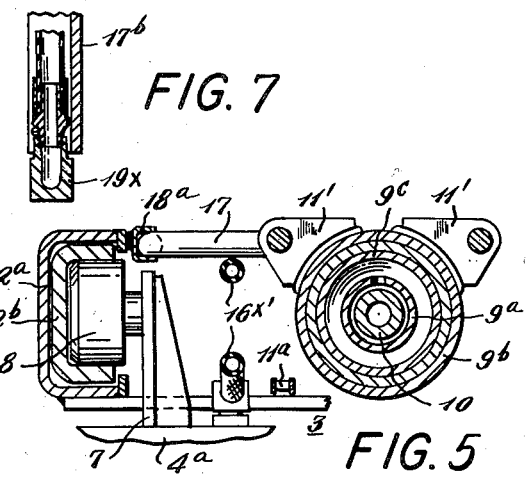
INVENTOR.
FRANK J. SCHENKELBERGER
BY
Geo. B. Pitts
ATTORNEY

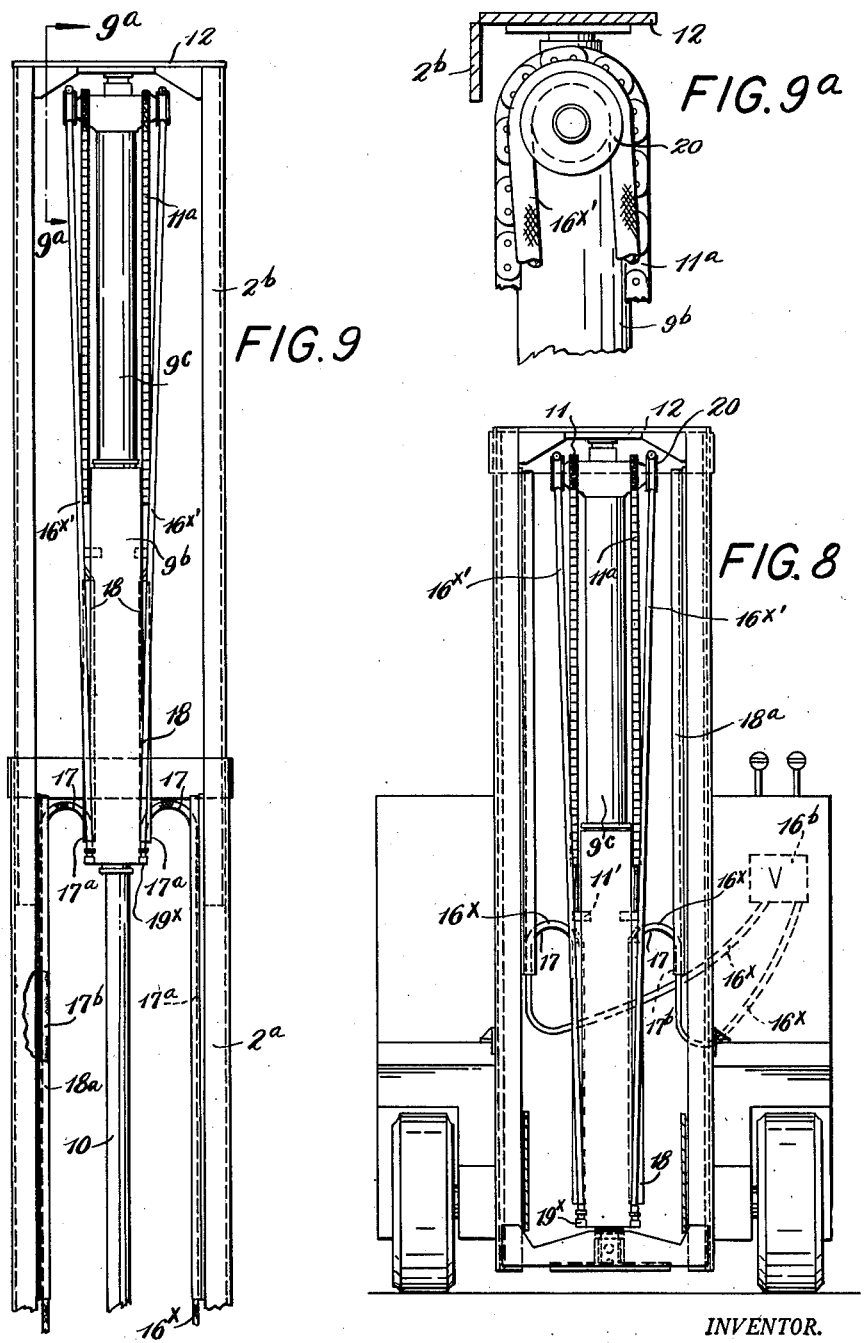

May 7, 1957  F. J. SCHENKELBERGER  2,791,293
INDUSTRIAL TRUCK
Filed Nov. 2, 1953  6 Sheets-Sheet 5
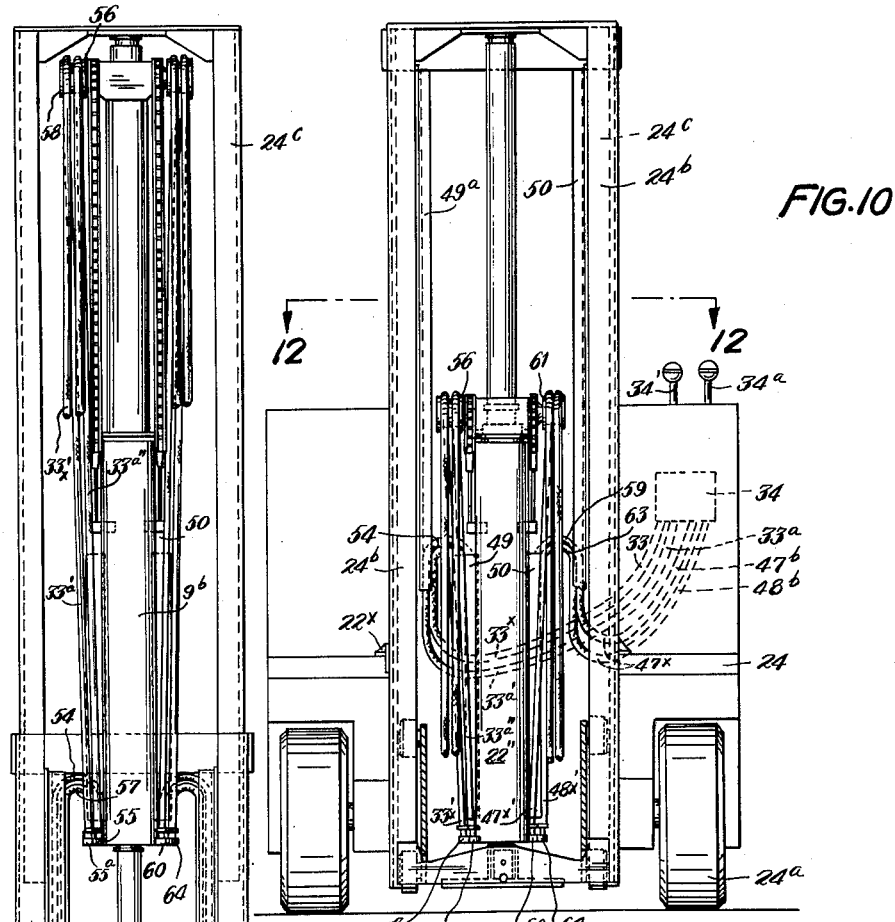
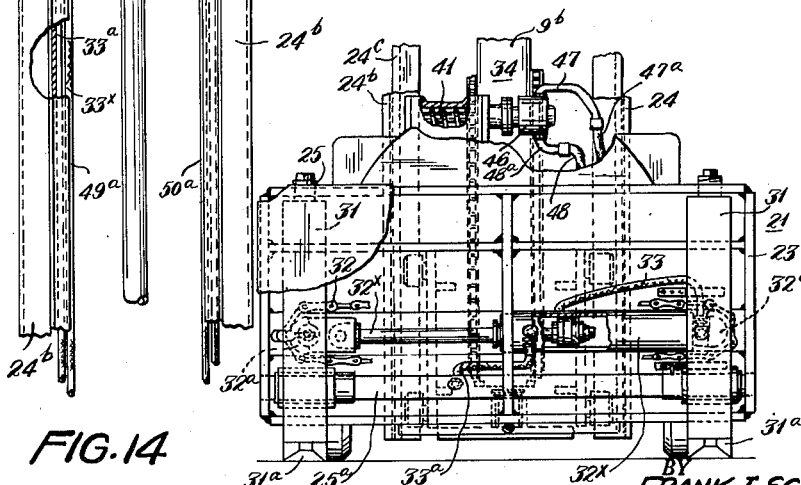
INVENTOR.
FRANK J. SCHENKELBERGER
BY Geo. B Pitts
ATTORNEY May 7, 1957     F. J. SCHENKELBERGER     2,791,293
INDUSTRIAL TRUCK Filed Nov. 2, 1953     6 Sheets-Sheet 6

INVENTOR.
FRANK J. SCHENKELBERGER
Geo. B. Pitts
ATTORNEY

United States Patent Office 2,791,293
Patented May 7, 1957

2,791,293

INDUSTRIAL TRUCK

Frank J. Schenkelberger, North Olmsted, Ohio, assignor, by mesne assignments, to The Baker-Raulang Company, a corporation of Delaware Application November 2, 1953, Serial No. 389,634

4 Claims. (Cl. 187—9)

This invention relates to an industrial truck of the type having on its frame guide means for an elevating member which is movably mounted on the latter for vertical movement, the member in turn being provided with movable load engaging, handling and carrying devices and hydraulically operated means therefor; more particularly the invention is directed and relates to the supporting means for the conduits through which fluid pressure is supplied to the hydraulically operated means and the fluid discharge therefrom. The supply and discharge conduits include portions consisting of hoses to accommodate the vertical movement of the elevating member, whereby the load engaging and handling devices may be operated in all positions of the elevating member. Heretofore, in trucks of this type, various arrangements have been employed for supporting the flexible sections of the fluid conduits, but according to my knowledge, these arrangements have involved serious difficulties with respect to assembly of the flexible sections in position and disassembly thereof, due to the employment of clips and like devices, especially where these supporting devices for these sections were incorporated and moved with the raising mechanism for the elevating member. In the latter referred to arrangement, the raising mechanism included chains trained over sprockets and connected to the raisable or elevating member, the flexible sections of the conduits being fixedly related to and movable with the chains, so that during the engagement of the chain links with the sprockets the relative movement between the surfaces of the links and contiguous portions of the flexible sections subjected the latter to strains and wear and hence shortened the life thereof.

The invention herein disclosed and claimed is of simplified form, consisting of a minimum number of parts adapted to support the flexible fluid flow portions of the fluid conduits, for one or more fluid operated mechanisms, independently of the chains for raising the load carrier, with the result that strains on the flexible fluid flow portions endwise thereof are eliminated and wear on the exterior surfaces thereof is materially reduced.

One object of the invention is to provide, in a truck of the type referred to, improved means of simplified form for supporting the flexible portions of the fluid connections leading to a fluid operated mechanism on the raisable load carrier of the truck.

Another object of the invention is to provide in a truck having a raisable load carrier and a fluid operated mechanism mounted on the latter, improved means for supporting the flexible fluid conduits leading to the mechanism, whereby the flexible conduits may be readily positioned and strains on the flexible conduits endwise thereof during movement of the raisable carrier are eliminated.

A further object of the invention is to provide, in a truck of the type referred to, improved means for supplying fluid to and from the hydraulic mechanism on the load carrier of the truck, consisting of sectional fluid conduits for the mechanism and simplified means for supporting the conduit sections applicable to a load carrier which is operable to various levels above and below the upper ends of the fixed guides on the truck.

A still further object of the invention is to provide, in a truck of the type referred to, improved means for supporting the flexible conduits for the hydraulically operated mechanism on the load carrier, whereby clips and other securing devices for the conduits are eliminated, thereby facilitating assembly of the latter.

Other objects and advantages of the invention will be apparent to those skilled in the art to which my invention relates from the following description taken in connection with the accompanying drawings, wherein—

Fig. 1 is a fragmentary side elevation of an industrial truck embodying my invention;

Fig. 2 is a fragmentary front elevation on the line 2—2 of Fig. 1;

Fig. 3 is a section on the line 3—3 of Fig. 1;

Fig. 4 is a section on the line 4—4 of Fig. 3;

Fig. 5 is a fragmentary section on the line 5—5 of Fig. 3;

Fig. 6 is a section on the line 6—6 of Fig. 3;

Fig. 7 is a fragmentary section on the line 7—7 of Fig. 6;

Fig. 8 is a section similar to Fig. 3, but showing the position of the parts when the load carrier is raised to a level adjacent the upper end of the fixed guides on the frame, as shown in dotted lines in Fig. 1;

Fig. 9 is a fragmentary section on the line 3—3 of Fig. 1, but showing the position of the parts when the load carrier is raised to a level above the fixed guides on the frame, as shown in dotted lines in Figs. 1 and 3;

Fig. 9a is a fragmentary section on the line 9a—9a of Fig. 9, enlarged;

Fig. 10 is a section on the line 10—10 of Fig. 12, showing a modified form of construction;

Fig. 11 is a fragmentary front elevation showing the load carrier, parts being broken away;

Fig. 14 is a sectional view showing the position of parts when the carrier is raised to a level above the fixed guides, the elevating member and carrier being omitted to clarify the illustration.

Figures 12, 13:
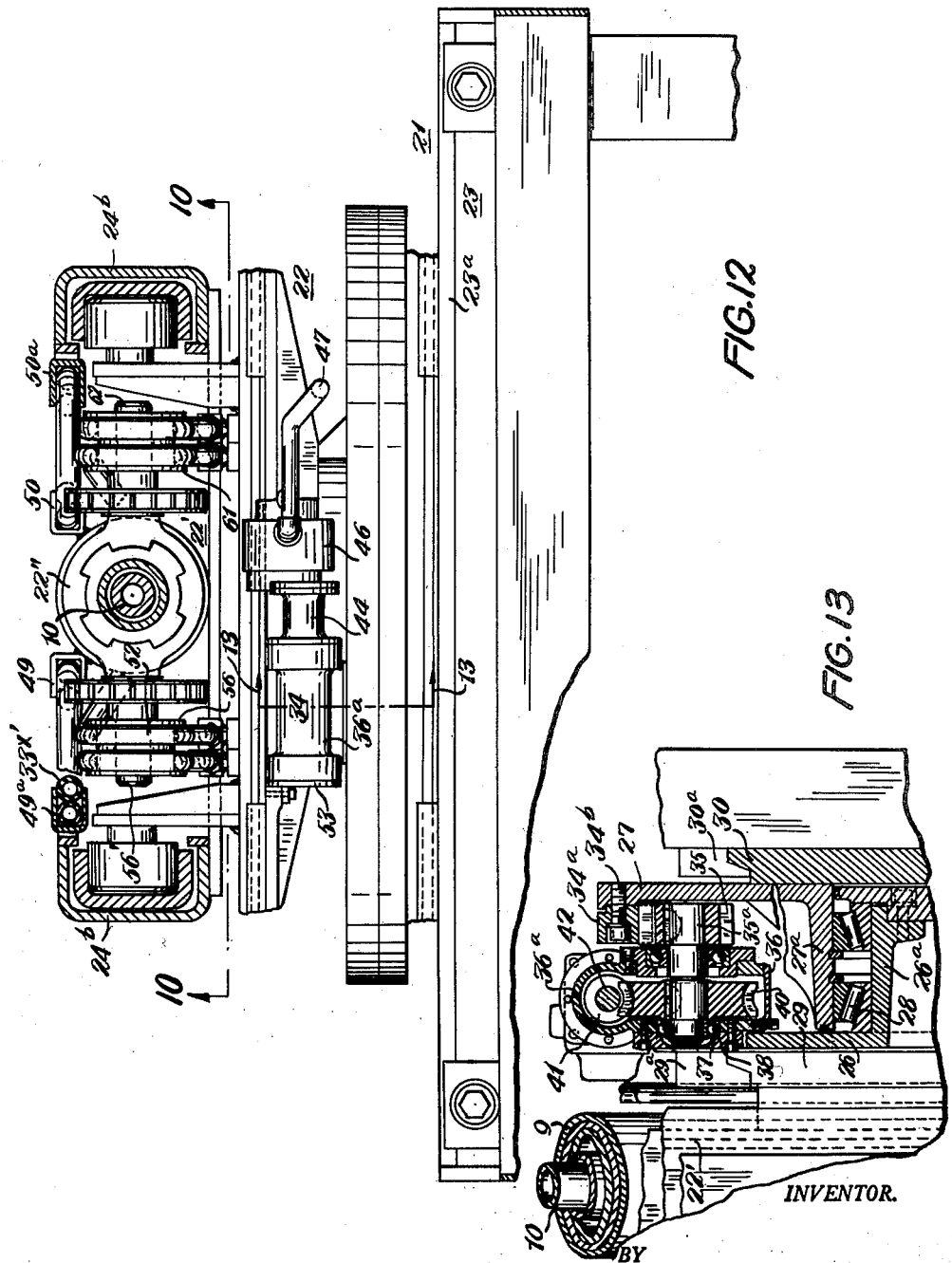
Fig. 12 is a section on the line 12—12 of Fig. 10.
Fig. 13 is a fragmentary side elevation with parts shown in section approximately on the line 13—13 of Fig. 12.

In the drawings, referring to Figs. 1 to 9a, inclusive, 1 indicates a truck frame mounted on a pair of rear wheels (not shown) and a pair of front wheels 1a; one pair of wheels being driven and the other pair being steerably mounted in a suitable manner, whereby the truck may be steered. The driving means for the driven wheels and operating connections for the steerable wheels form no part of the present invention for which reason these means and connections are not shown. 2 indicates suitable upright guide means for an elevating member 3, consisting of a pair of outer guides 2a supported on and fixed to a base 2a' and inner guides 2b endwise slidable on the outer guides 2a. The outer guides 2a are preferably trunnioned on and between forwardly extending members 2' forming part of the frame 1, whereby the guides 2a and all parts thereon may be tilted inwardly and outwardly by a suitable power mechanism, parts of which are shown at 2x.

4 indicates as an entirety a load carrier consisting of a frame 4a and a pair of load engaging and supporting members 5, 5a, which, being mounted for movement transversely of the frame 4a and operated hydraulically by a cylinder-piston unit, illustrate one form of load carrier wherein flexible conduits, later referred to, are employed to supply fluid pressure to the cylinder and fluid discharge therefrom. The frame 4a, as shown herein, consists of side walls 4x, 4x' a bottom wall 4b, a top wall 4c and panels 4d, 4d', which form a rear wall. The frame 4a is reinforced by a vertical member 6 and horizontal members 6a. 7 indicates spaced brackets fixed to and extending inwardly from the panels 4d, 4d'. Each bracket 7 is provided on its outer side with upper and lower stud shafts on which rolls 8 are rotatably mounted. As shown in Fig. 4, the rolls engage the side walls of the inner guides 2b and support the elevating member thereon for movement substantially from end to end of these guides to raise the carrier 4 by a suitable mechanism preferably of the hydraulically operated type indicated as an entirety at 9. The hydraulically operated mechanism 9 is preferably of the compound cylinder form of construction consisting of a plurality of concentrically related inner, outer and intermediate cylinders 9a, 9b, 9c, respectively. The cylinders 9a, 9b, 9c, surround a tubular member 10, which is suitably mounted on the base 2a' between the guides 2a and extends upwardly approximately to the upper ends of the latter. The tubular member 10 adjacent its lower end is connected with a conduit 10a leading from a source of fluid under pressure supply (not shown) mounted on the truck frame 1, the conduit 10a being provided with a valve (not shown) adapted to be operated by a lever 10b, positioned for operation by the truck driver, whereby supply of fluid pressure to the tubular member 10 is controlled. The wall of the tubular member 10 and inner cylinder 9a are formed with flow ports, whereby the fluid pressure is supplied from the tubular member to the annular spaces within the cylinders 9a, 9b, 9c. The mechanism 9 is similar in construction to that shown in Letters Patent No. 2,641,336 to Clarence W. Chanda (to which reference may be made) and operates similarly thereto as follows: operation of lever 10b in one direction supplies fluid under pressure through conduit 10a and to the tubular member 10 and from the latter through the ports into the cylinders 9a, 9b, 9c, the effect of which is to initially raise the intermediate cylinder 9c. The cylinder 9c is provided at diametrical opposite sides with sprockets 11 over which chains 11a are trained. The inner ends of the chains are suitably anchored (preferably on lugs 11'), whereas their outer ends are suitably connected to the elevating member 3. Accordingly, the upward movement of the cylinder 9c raises the elevating member and carrier relative to the guides 2a and 2b to the level as shown in dotted lines at a in Fig. 1 or to any selected intermediate level. However, upon upward movement of the carrier 4 to position a, if the supply of fluid pressure is continued, the pressure is applied to the cross member 12, which is connected to the upper ends of the guides 2b, to raise the latter and thus position the carrier at any selected higher level (see dotted lines in Figs. 1 and 3), as shown in Fig. 9, or within the limit of movement of the guides 2b relative to the guides 2a. Operation of the lever 10b to its other position releases the fluid pressure and connects the conduit 10a with the reservoir of the fluid supply system, so that the elevated parts gravitate to normal position as shown in Figs. 1 and 3.

The supports 5, 5a, are connected at their inner ends to upstanding legs 5b, 5b', respectively, which are slidably mounted on upper and lower guide devices 12, 13, respectively. The lower guide devices 13 consist of a horizontally disposed guide 13a supported at its opposite ends on the side walls 4x, 4x', whereas each leg 5b, 5b', is provided on its inner side with a sleeve 13b which slidably fits the guide 13a. The upper guide devices 12 consist of rollers 12a each mounted on a stud shaft supported in a black fixed to the inner side and at the upper end portion of the adjacent leg. As shown, the rollers 12a engage the rear side of the frame top wall 4c and cooperate with the guide devices 13 to slidably support the load supports 5, 5a, on the frame 4a. The mechanism for moving the supports 5, 5a, toward or away from each other or both in fixed spaced relation transversely of the frame 4a consists of an endless chain 14 and a cylinder-piston unit 15 operatively connected therewith. The endless chain 14 engages reeving elements 14a, 14', suitably supported on the side walls 4x, 4x', respectively, and extends between the reeving elements to provide upper and lower runs 14b, 14b', respectively. 14x indicates detachable connections between each leg 5b, 5b', and the chain runs 14b, 14b'. As shown in Fig. 2, the supports 5, 5a, are positioned adjacent the side walls 4x, 4x', and the leg 5b is connected to the upper run 14b and the leg 5b' is connected to the lower run 14b', for movement toward each other. However, the legs can be initially positioned in other spaced relationships for movement toward or away from each other or by changing the connection of the leg 5b' to the upper run 14b the supports 5, 5a, may be selectively related in fixed spaced relation for movement transversely in either direction. The cylinder-piston unit 15 consists of a cylinder 15a and a piston 15b reciprocatably mounted therein. The outer end of the cylinder is mounted on one of the reeving devices (preferably the reeving device mounted on the side wall 4x') and extends horizontally therefrom between the runs 14b, 14b'. The piston 15b is connected to the inner end of a rod 15c, the outer end of which is preferably connected to the leg 5b. As the leg 5b is connected to the adjacent chain run, operation of the piston 15b in either direction serves to drive the chain 14 in a corresponding direction, whereby the supports 5, 5a, are moved transversely of the frame 4a. In the arrangement of the cylinder-piston unit, the applied force to move the leg 5b and drive the chain 14 in either direction operates in a plane parallel to and midway the chain runs 14b, 14b'. The construction of the carrier above described forms the subject-matter of U. S. Patent No. 2,663,433, issued December 22, 1953, on my co-pending application Ser. No. 221,638, filed April 18, 1951 and now Patent No. 2,663,443, and is illustrative of one form of carrier which may be employed in connection with the invention herein disclosed.

The opposite ends of the cylinder 15a are provided with suitable fittings to which are connected conduits 16, 16a, respectively. The conduits 16, 16a, are connected through a valve 16b (which is operated by a lever 16c) to the fluid under pressure system, the valve 16b being operable to control the supply of fluid pressure to either end of the cylinder and discharge of the fluid from the other end thereof, whereby the piston 15b may be moved in either direction.

Each conduit 16, 16a, consists of inner and outer sections 16x, 16x', respectively, formed of flexible hose, each inner section when positioned consisting of an inverted U-shape hose. While the hose sections 16x, 16x', are referred to as flexible, this characteristic thereof permits each inner section 16x to be readily positioned, as later set forth, in which operation the loop 17 and the oppositely extending contiguous portions thereof are put under resilient or spring tension and tend to expand outwardly in opposite directions. As shown, the oppositely extending contiguous portions of the loop 17 of hose section 16x for the conduit 16a form legs 17a, 17b, which are seated under pressure in a pair of transversely alined, parallel, elongated seats 18, 18a, respectively (each of U-shape in cross section), the openings in the latter being in opposed relation. The seats 18, 18a, of each pair have a predetermined spaced relation, so that when the legs 17a, 17b, are positioned therein the intermediate portion (which forms the loop 17) is put under tension, the effect of which is to exert pressure outwardly on and maintain the legs in the adjacent seats 18, 18a. Each seat 18a extends from the upper end of the adjacent guide 2a downwardly into overlapping relation to the seat 18. The bottom wall of the channel 18a is suitably fixed to a retainer strip 19 for the inner guide 2b, which strip in turn is suitably fixed to the edge of the outer side wall of the adjacent guide 2a, whereas each seat 18 extends longitudinally of and is suitably fixed to the outer wall of the cylinder 9b and moves therewith (see Fig. 9). As shown, the loop 17 is initially disposed at a level above the base 2a' to provide a hose leg 17a of sufficient length to compensate for the movement of guides 2b upwardly relative to the guides 2a, as shown in Fig. 9. The seat 18 for the hose leg 17a is substantially co-extensive in length to the latter. The outer end of the inner hose section 16x is detachably connected to a fitting 19x which is connected to the wall of the cylinder 9b adjacent to and in alinement with the lower end of the adjacent seat 18. The fitting 19x is connected by a nipple 19' to a separate fitting 19a, the latter in turn being detachably connected to the inner end of the outer section of the hose 16x'. The hose section 16x' extends upwardly from the fitting 19a independently of the adjacent chain 11a and is trained over a pulley 20 rotatable on the shaft for the adjacent sprocket 11 and extends downwardly from the pulley independently of the adjacent chain 11a and sprocket for connection to a fitting 19b, the latter being connected to that portion of the hose leading through an opening 20a formed in the adjacent panel 4d' for connection to one of the fittings for the cylinder 15a. As will be observed, the hose sections 16x, 16x', of the conduit 16 are similarly mounted to the conduit 16a.

The hose sections 16x are initially positioned as shown in Fig. 3 in which position the legs 17a—17b, 17a—17b, remain in the seats 18—18a, 18—18a, during movement of the elevating member 3 and carrier 4 upwardly to the position a, as shown in dotted lines in Fig. 1, and downwardly.

Upon movement of the carrier 4 to position a, if the supply of fluid pressure to the tubular member 10 is continued, the cylinders 9a, 9b, 9c, and the guides 2b will be moved upwardly, thereby moving the carrier 4 to a higher level, as shown in Fig. 9, and contiguous portions of the legs 17a—17a will disengage the seats 18—18 and, through the progressive looping thereof, progressively engage the seats 18a—18a. In the downward movement of the guides 2b and cylinders 9a, 9b, 9c, to the position shown in Fig. 3, the contiguous portions of the legs 17a—17a will progressively disengage the seats 18a—18a and progressively re-engage the seats 18—18. Due to the alined relations of the seats 18—18a, 18—18a, and the resiliency of the looped portions 17 during movement of the carrier in either direction, the hose legs 17a—17b, 17a—17b, are maintained in the seats, so that the employment of clips and other devices to support the flexible portions of the conduits 16, 16a, are totally eliminated, with the result that the assembly of the conduits is facilitated and the supporting means for the flexible hose sections are materially simplified. Furthermore, as each conduit 16, 16a, consists of inner and outer flexible hose sections and the inner connected ends thereof are fixed to a movble member of the means for raising the carrier, danger of either hose section becoming displaced is avoided.

The frame 4a is preferably provided with a plate 4e, which forms a back for the loads.

Figs. 10 to 14, inclusive, illustrate a modified form of construction wherein the carrier, indicated as an entirety at 21, comprises inner and outer, separate hydraulically operated mechanisms 22, 23, the inner mechanism 22 being mounted on the elevating member 22' for movement therewith and rotatably supporting the outer mechanism 23, which is provided with load engaging and supporting devices.

The mechanisms 22, 23, are for illustrative purposes to show the application of the herein disclosed invention wherein means are provided for supporting the flexible conduits for the supply and discharge of fluid to and from more than one hydraulically operated mechanism adapted to transport and handle loads.

24 indicates the truck frame mounted on pairs of wheels, the front wheels being shown at 24a. 24b indicates fixed guides mounted on the frame 24 and 24c indicates separate guides movable endwise of the guides 24b, the elevating member 22' being mounted for vertical movement on the guides 24c, as shown in Fig. 12. The outer or fixed guides 24b are trunnioned on the truck frame, as shown at 22x, whereby the guides and all parts thereon may be tilted forwardly and rearwardly by suitable means (not shown). The raising means for the elevating member 22' is preferably similar in construction and operation to that already set forth, whereby the carrier 21 may be raised to selected levels below and above the upper ends of the fixed guides, Fig. 14 showing the position of certain parts (later refrred to) when the elevating member 22' and carrier 21 are raised above the fixed guides to their uppermost positions.

The mechanism 22 consists of an inner member 26 (preferably of substantially annular shape) having an outwardly extending integral collar 26a, concentric to the axis of the inner member 26, and an outer member 27 (preferably of substantially annular shape) having an inwardly extending collar 27a, concentric to the axis of the member 27 and disposed in telescopic relation to the collar 26a. As shown in Fig. 13, the opposed walls of the collars 26a, 27a, form seats for the races of anti-friction bearings 28 to rotatably support the outer member 27 on the inner member 26. The inner member 26 is mounted on the elevating member 22' by pairs of inter-engaging elements 29, 29a, whereas the rear wall of a transversely disposed frame 23a, forming part of the mechanism 23, is mounted on the outer rotatable member 27 by pairs of inter-engaging elements 30, 30a. The mechanism 23 consists of the frame 23a having upper and lower guides 25, 25a, on which the upstanding legs 31 of load supporting members 31a are movably mounted for movement transversely of the frame 23a. 32 indicates an endless flexible member (preferably a chain) trained on reeving devices 32a, mounted on the side walls of the frame 23a, to provide upper and lower runs. The legs 31 are connected to the chain runs as already set forth and moved on the guides 25, 25a, by a cylinder-piston unit, the cylinder element 32x being connected at its outer end to the adjacent reeving device and provided with a reciprocatable piston element. The piston element is connected to a rod 32x', the outer end of which is connected to the remote leg 31. The cylinder element 32x is provided adjacent its opposite ends with fluid connections to which are connected hose 33, 33a, respectively. The hose 33, 33a, extend to a valve 34, which is connected to a fluid pressure supply and discharge system (not shown). The valve is operated by a lever 34a to control the supply of fluid pressure to either end of the cylinder element 32x and discharge of fluid from its other end in a well known manner to move that leg 31, to which the rod 32x' is connected, the endless member 32 and the other leg, the effect of which is to move the load supporting members 31a transversely of the frame 23a. The mechanism 23 is preferably similar in construction to that shown in Fig. 2. The hose 33 consists of an inner inverted U-shape flexible hose 33x and an outer flexible hose 33x', and the hose 33a consists of an inner inverted U-shaped hose 33a' and an outer flexible hose 33a'', the hoses 33x—33x', 33a—33a'', being supported and arranged as later set forth.

34 indicates as an entirety power means for rotating the outer member 27 in opposite directions, whereby the load supporting members 31a may be revolved to and held at load pick-up position, a load picked up and raised, or at a load discharge position. The load, when raised, may be rotated in either direction for inspection, transported, discharged at an elevated level or lowered and discharged at ground level. The power mechanism 34 consists of the following: 34a indicates an internal gear fixed to the inner face of the outer rotatable member 27 by countersunk cap screws 34b and meshing with a pinion 35, which is fixed to the outer end portions of a shaft 35a. As shown, the diameter of the gear 34a is equal to that of the member 27. In this arrangement, the application of the power or torque to rotate the mechanism 23 is at the maximum distance radially of the axis of the member 27 and hence a minimum power supply is required. 36 indicates a housing formed of spaced walls and an upper hollow member 36a suitably connected together, the inner housing wall having lateral extensions suitably secured to the inner annular member 26 outwardly of the collar 27a. The spaced walls accommodate inserts 37 which support suitable anti-friction bearings 38 for the shaft 35a. 40 indicates a worm gear disposed within the housing 36 and keyed to the shaft 35a, between the bearings 38. The worm gear 40 is in mesh with a worm 41 integral with a shaft 42, which is mounted in suitable outer and inner anti-friction bearings seated in the end walls of the member 36a. The outer bearing is held in position by a cap plate 53, whereas the inner bearing is held in position by a hollow member 44 which is axially related and rigidly secured at one end to the adjacent end of the member 36a. The opposite end of the member 44 is rigidly secured to a housing 46 for a suitable hydraulic motor. The inner end of the shaft 42 and the outer end of the shaft for the hydraulic motor extend into the hollow member 44 and both shaft ends are suitably connected together, whereby the motor is drivingly connected to the shaft 42, and through the gearing 41, 40, 35, 34a, to the rotatable supporting member 27. The shaft of the motor 46 is driven in either direction dependent on the direction of flow of the liquid under pressure, through the conduits 47, 48, supplied by the pump of the fluid pressure system. The construction of the mechanism 22, including the power mechanism 34 above described are preferably similar in construction to that shown in Letters Patent No. 2,599,524 to Max Lehmann, for which reason it is not more fully illustrated and described. The conduits 47, 48, are connected to the valve 34, which is controlled by a lever 34′ to supply the fluid pressure through either conduit 47, 48, and discharge fluid through the other conduit. The conduits 47, 48, consist of metal pipes the inner ends of which are connected to diametrical opposite sides of the motor housing 46, and flexible hoses 47a, 48a, connected to the outer ends of the pipes 47, 48, respectively. The hose 47a consists of an inner inverted U-shaped flexible hose 47x and an outer flexible hose 47x′, and the hose 48a consists of an inner inverted U-shaped flexible hose 48x and an outer flexible hose 48x′.

The hoses 33x—33x′, 33a′—33a′′, 47x—47x′, and 48x—48x′ are supported and arranged as follows: 49, 49a, 50, 50a, indicate pairs of elongated seats, the seats of each pair being channel shaped in cross-section and disposed in transverse alined relation. The sides of each seat are disposed in parallel relation and extended outwardly from end to end a distance to substantially enclose the adjacent portions of two hoses in side-by-side relation, preferably with their axes disposed in a transverse plane. The seats 49a, 50a, are elongated and suitably fixed to the outer side walls of the fixed guides 24b, respectively, whereas the other seats 49, 50, are suitably fixed to the outer side of the outer cylinder 9b of the raising means for the elevating member 22′.

The inner inverted U-shaped hoses 33a′, 48x, may be mounted in one pair of seats and the inner inverted U-shaped hoses 33x, 47x, may be mounted in the other pair of seats; but by preference, the inverted U-shaped hoses 33a′, 33x, are mounted in the pair of seats 49, 49a, and the inverted U-shaped hoses 47x, 48x, are mounted in the pair of seats 50, 50a. As shown, the intermediate portion of the inverted U-shaped hose 33a′ is looped as shown at 54, the opposite contiguous portions of which provide legs engaging the bottom walls of the seats 49, 49a, respectively, under pressure. The inner leg extends downwardly and is connected to a fitting 55, which in turn is connected to the adjacent end of the outer flexible hose 33a′′. The fitting 55 is fixed to the adjacent side wall of the cylinder 9b for movement therewith for a purpose later apparent. The outer hose 33a′′ extends upwardly from the fitting 55 and reeves around a pulley 56 rotatably mounted on the shaft 56′ for the adjacent chain sprocket, and downwardly from the pulley for connection to the adjacent end of the cylinder element 32x. The inner inverted U-shaped hose 33x is looped as shown at 57 the opposite contiguous portions of which provide legs seated within the side walls of the seats 49, 49a, respectively, the loop 57 being in nested relation to the loop 54 and engaging the latter and its legs under pressure. The inner leg of the loop 57 extends downwardly and is connected to a fitting 55a, which in turn is connected to the adjacent end of the outer flexible hose 33x′. The fitting 55a is fixed to the adjacent side wall of the cylinder 9b for movement therewith for a purpose later apparent. The outer flexible hose 33x′ extends upwardly from the fitting 55a and reeves around a pulley 56 and downwardly from the latter for connection with opposite end of the cylinder element 32x.

The inverted U-shaped hose 47x is looped as shown at 59, the opposite contiguous portions of which provide legs engaging the bottom walls of the seats 50, 50a, under pressure. The inner leg extends downwardly and is connected to a fitting 60, which in turn is connected to the adjacent end of the outer flexible hose 47x′. The fitting 60 is fixed to the adjacent side wall of the cylinder 9b for movement therewith for a purpose later apparent. The outer flexible hose 47x′ extends upwardly and reeves around a pulley 61, rotatable on the shaft 62 for the adjacent chain sprocket and downwardly for connection to the pipe 47. The inverted U-shaped hose 48x is looped at 63, the opposite contiguous portions of which provide legs fitting within the side walls of the seats 50, 50a, respectively, the loop 63 being in nested relation to the loop 59 and engaging the latter and its legs under pressure. The inner leg extends downwardly and is connected to a fitting 64 which in turn is connected to the adjacent end of the outer flexible hose 48x′. The fitting 64 is fixed to the adjacent side wall of the cylinder 9b for movement therewith for a purpose later apparent. The outer flexible hose 48x′ extends upwardly from the fitting 64 and reeves around a pulley 61 and downwardly for connection to the pipe 48.

As shown in Fig. 14, when the carrier 21 is being moved to a level above the upper ends of the fixed guides 24b, contiguous portions of the inner legs of the inverted U-shaped flexible hoses 33a, 33x, simultaneously progressively move from the seat 49 and simultaneously progressively move into the seat 49a, whereas the contiguous portions of the legs of the inner U-shaped hoses 47x, 48x, simultaneously progressively move from the seat 50 and progressively move into the seat 50a. During this upward movement of the carrier 21 the loops 54—57, 59—63, are progressively formed; and in the downward movement of the carrier 21 the loops are progressively formed in the opposite direction and the contiguous portions of the legs progressively move in the opposite direction.

It will be observed that the flexible hoses are supported by the guides 49—49a, 50—50a, the cylinder 9b and pulleys independently of the sprockets and chains and thus eliminate the employment of clips and other devices and facilitate their mounting in position.

What I claim is:

1. A truck comprising a main guide mounted on the truck frame, a separate guide mounted on said main guide for movement endwise thereof, an elevating member movably mounted on said separate guide, a carrier on said elevating member and comprising a movable load supporting device and a hydraulically operated mechanism for moving said device in one direction, means for raising said elevating member to selected levels, said means including a movable element operatively connected to said elevating member and provided with a pulley and a separate element movable relative to said main guide during movement of said elevating member in either direction above and relative to one of said levels, a fluid pressure supply system, a valve controlled conduit connected with said fluid pressure supply system, elongated aligned parallel inner and outer seats mounted on said separate movable element and said main guide respectively, a portion of said conduit consisting of an inverted U-shaped flexible hose section and an outer flexible hose section, and a fitting, mounted on said separate movable element, for connecting the inner ends of said sections together, the legs of said inner U-shaped hose section being mounted in said seats, contiguous portions of said legs, during movement of said separate movable element in either direction, being arranged to progressively disengage one of said seats and progressively engage said other seat, and said outer flexible hose section extending from said fitting and being reeved on said pulley on said first-mentioned movable element and connected at its other end to said hydraulically operated mechanism.

2. A truck comprising a main guide mounted on the truck frame, a separate guide mounted for movement endwise of said main guide, an elevating member movable on and endwise of said separate guide, a carrier on said elevating member and comprising a movable load supporting device and hydraulically operated means for moving said device in opposite directions, a fluid pressure supply and discharge system, valve controlled conduits connected with said fluid pressure supply and discharge system, means for raising said carrier to selected levels, said raising means including a movable element operatively connected to said elevating member and provided with a pulley and a separate element movable relative to said main guide during movement of said elevating member in either direction above and relative to one of said levels, and elongated alined parallel inner and outer seats mounted on said separate movable element and said main guide, respectively, corresponding portions of said conduits consisting of inner inverted U-shaped flexible hoses disposed in nested relation, corresponding legs of which are mounted in said seats, respectively, and outer flexible hoses, each connected at its inner end to the adjacent end of one of said U-shaped flexible hoses and mounted on said separate movable element, contiguous portions of corresponding legs of said inverted U-shaped flexible hoses, during movement of said separate movable element in either direction, being arranged to progressively disengage one of said seats and progressively engage the other seat, and said outer flexible hoses extending to and reeved on said pulley and connected at their outer ends to said hydraulically operated means.

3. A truck comprising main guides mounted on the truck frame, separate guides mounted for movement endwise of said main guides, an elevating member movable on and endwise of said separate guides, a carrier on said elevating member and comprising a movable load supporting device and hydraulically operated means for moving said device in opposite directions, a fluid pressure supply and discharge system, valve controlled conduits connected with said fluid pressure supply and discharge system, means for raising said carrier to selected levels, said raising means including a movable element operatively connected to said elevating member and provided at its opposite sides with pulleys, and a separate element movable relative to said main guides during movement of said elevating member in either direction above and relative to one of said levels, and pairs of elongated alined parallel inner and outer seats mounted on said separate movable element and said main guides, each of said conduits consisting of an inner inverted U-shaped flexible hose the legs of which are mounted in one of said pairs of seats, respectively, and an outer flexible hose, each outer hose being connected at its inner end to the adjacent end of one of said U-shaped flexible hoses and mounted on said separate movable element, contiguous portions of corresponding legs of said inverted U-shaped flexible hoses, during movement of said separate movable element in either direction, being arranged to progressively disengage one of said seats and progressively engage the other seat, and said outer flexible hoses extending to and reeved on said pulleys, respectively, and connected at their outer ends to said hydraulically operated means.

4. A truck comprising substantially vertically disposed main guides mounted on the truck frame, separate guides movable endwise of said main guides, an elevating member movably mounted on said separate guides, a carrier supported on said elevating member and movable therewith and comprising a movable load supporting device and separate hydraulically operated motors provided with fluid connections, for operating said device in opposite directions, means operatively connected to said elevating member and said separate guides, respectively, for raising said carrier to selected levels, said raising means including a movable element provided with pulleys and a separate element movable relative to said main guides, a fluid pressure supply and discharge system, valve controlled fluid conduits for each of said motors connected with said fluid pressure supply and discharge system, and pairs of elongated inner and outer alined seats, the inner seat of each pair being mounted on said separate movable element and the outer seat of each pair being mounted on said main guides, respectively, corresponding portions of said conduits for each motor consisting of inner inverted U-shaped flexible hoses and outer flexible hoses, the inner end of each inner inverted U-shaped hose being connected to the adjacent end of one of said outer hoses and mounted on said separate movable element, said inner U-shaped hoses of the conduits for each of said motors being disposed in nested relation and the legs thereof being mounted in one of said pairs of seats, and, during movement of said separate movable element in either direction contiguous portions of the legs in corresponding adjacent seats simultaneously progressively disengage the latter and progressively engage the other corresponding seats and said outer flexible hoses being extended for reeving about said pulleys and connection at their outer ends to said fluid connections, respectively, for the adjacent motor.

References Cited in the file of this patent

UNITED STATES PATENTS

| | | |
|---|---|---|
| 2,432,411 | Guerin et al. | Dec. 9, 1947 |
| 2,528,401 | Ulinski | Oct. 31, 1950 |
| 2,554,930 | Ulinski | May 29, 1951 |
| 2,574,045 | Lapham | Nov. 6, 1951 |
| 2,575,552 | Glenn | Nov. 20, 1951 |